United States Patent [19]

Löfgren

[11] Patent Number: 4,472,052
[45] Date of Patent: Sep. 18, 1984

[54] MEASURING SIGNAL TRANSMISSION DEVICE FOR TRANSMITTING OPTICAL SIGNALS BETWEEN A ROTATING PORTION AND A ROTATIONALLY STATIONARY PORTION

[75] Inventor: Folke Löfgren, Västerås, Sweden

[73] Assignee: Asea Aktiebolag, Västerås, Sweden

[21] Appl. No.: 331,218

[22] Filed: Dec. 16, 1981

[30] Foreign Application Priority Data

Dec. 19, 1980 [SE] Sweden ............................... 8008985

[51] Int. Cl.³ ............................ G01J 5/08; G01J 5/62; G02B 5/14
[52] U.S. Cl. ...................................... 356/44; 250/227; 350/96.20
[58] Field of Search ................. 356/43, 44; 350/96.20; 250/227

[56] References Cited

U.S. PATENT DOCUMENTS

| | | | |
|---|---|---|---|
| 3,812,351 | 5/1974 | Coberley | 250/227 X |
| 3,922,063 | 11/1975 | Marrone | 350/96.15 |
| 4,124,272 | 11/1978 | Henderson et al. | 350/96.2 X |
| 4,215,275 | 7/1980 | Wickersheim | 356/44 X |
| 4,367,040 | 1/1983 | Goto | 356/44 |

FOREIGN PATENT DOCUMENTS

| | | | |
|---|---|---|---|
| 2237695 | of 0000 | Fed. Rep. of Germany . | |
| 55-87106 | 7/1980 | Japan | 350/96.2 |
| 7513014 | of 0000 | Sweden . | |

*Primary Examiner*—Vincent P. McGraw
*Attorney, Agent, or Firm*—Watson, Cole, Grindle & Watson

[57] ABSTRACT

The invention relates to a measuring signal transmission device for transmitting signals between a rotating portion and a rotationally stationary portion, for example in a large electrical machine. The rotationally stationary portion is journalled to the rotating portion in such a way as to accompany the latter portion in its axial and radial movements, and light is arranged to be transmitted in both directions between the rotating portion and the rotationally stationary portion by light conductors at the center axis of rotation and/or at specified radii and at least one light-conducting fiber is located in the rotating portion and at least one light-conducting fiber is located in the rotationally stationary portion, whereby the light signal transmission is arranged to take place between fibers located at the same radii in both portions.

13 Claims, 5 Drawing Figures

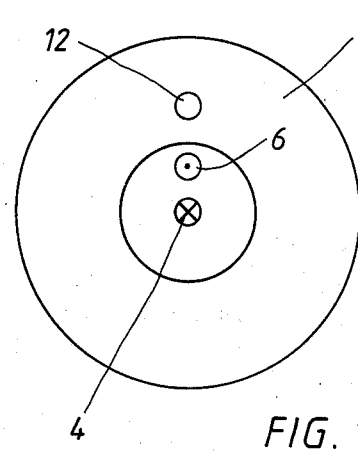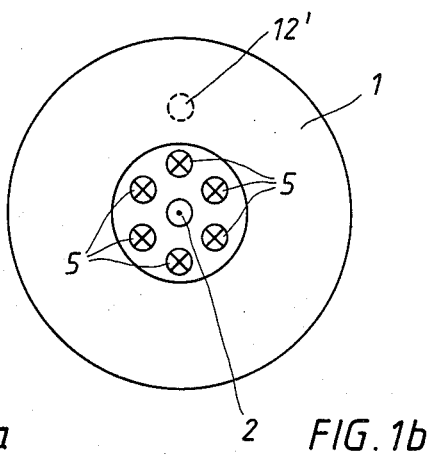
FIG. 1a  FIG. 1b
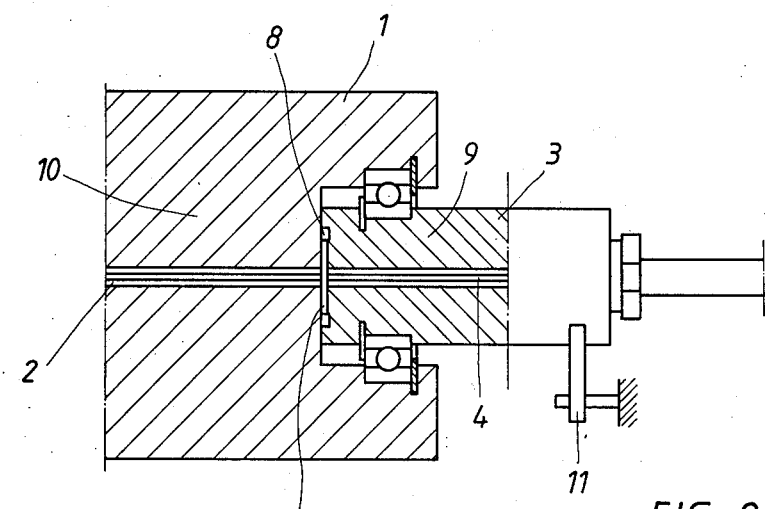
FIG. 2
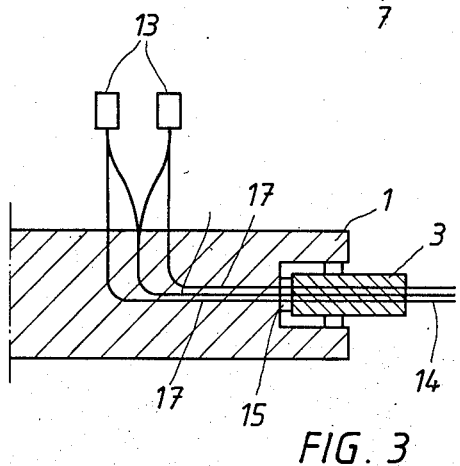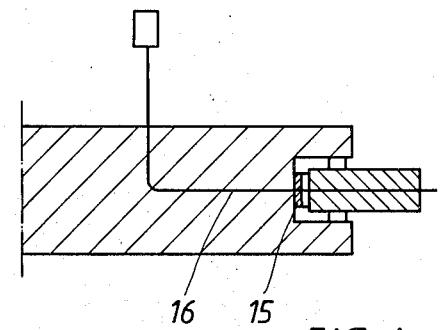
FIG. 3  FIG. 4

MEASURING SIGNAL TRANSMISSION DEVICE FOR TRANSMITTING OPTICAL SIGNALS BETWEEN A ROTATING PORTION AND A ROTATIONALLY STATIONARY PORTION

TECHNICAL FIELD

The present invention relates to a measuring signal transmission device for transmitting optical signals between relatively rotating membes (e.g., between a rotating portion and a rotationally stationary portion), optical transmission through the members being effected by means of light-conducting fibers or the like.

In, for example, a rotating machine or the like it may be desirable to be able to measure some condition of the machine during operation, such as the temperature in or close to the windings, for example in a large turbo-generator. In a number of different electrical and mechanical machines problems can arise in the transmission of optical signals from a measuring location to a measurement station when effecting measurements on rotating parts.

STATEMENT OF INVENTION

According to one aspect of the invention there is provided an optical signal transmission device for transmitting measuring signals between a rotating member and a rotationally stationary member, which device comprises bearing means rotatably interconnecting the rotationally stationary member and the rotating members in such a way as to provide confronting regions of the members between which relative rotation occurs, a light conductor in each member each having an end in the respective confronting regions with a gap between the light conductor whereby light transmission between the light conductors is possible across the gap at least once in each 360° rotation between the members.

Thus, by means of an optical signal transmission device according to the invention, optical measuring signals can be transmitted across a gap between relatively rotating members, which provides good possibilities for measurements to be made without causing electric insulating and disturbance problems and without the need to stop the rotating member. Further, the device can be used in very difficult environments. At the same time, a good accuracy of measurement and a reliable monitoring of the operation of large rotating machines can be obtained.

BRIEF DESCRIPTION OF DRAWINGS

The invention will now be described in greater detail, by way of example, with reference to the accompanying drawings, in which:

FIG. 1a shows an end section of a rotationally stationary member of an electrical machine, FIG. 1b shows a corresponding end section of a rotating member, such as a shaft end of the same machine, FIG. 2 shows a detail of the transition between the members shown in FIGS. 1a and 1b, FIG. 3 shows a schematic arrangement having several optical conductors in each member, and FIG. 4 shows a schematic arrangement with just one optical conductor in each member.

DESCRIPTION OF PREFERRED EMBODIMENTS

FIGS. 1a and 1b show the confronting end surfaces of a rotationally stationary member 3 and a rotating member 1 forming a measuring signal transmission device for an electrical machine. The rotating member 1 may, for example, be a rotor shaft. The rotationally stationary member 3 is journalled on the rotating member 1 so as to accompany this member in its axial and radial movements. From one or more sensors (not shown) in the rotating member 1, one or more light-conducting fibers 2 lead to an end surface of the member 1 and this fiber or these fibers 2 terminate either at the center or at a certain radius from the center (the axis of rotation). This fiber 2 has at least one corresponding fiber 4 in the rotationally stationary member 3. In the shown case in FIGS. 1a and 1b, a plurality of fibers 5 are arranged in the rotating member 1 at a certain radial distance from the center where the fiber 2 is situated. At the same radial distance from the center in the stationary member 3, there is arranged a fiber 6, which during the rotation of the member 1 will successively be brought into alignment with the fibers 5. These fibers 5 may be used to effect excitation of the sensors of one or more measuring transducers in the machine, and as a consequence of the relative rotation between members 1 and 3, the different excitation signals are scanned. The measuring signals can be transmitted at the center 4-2, but may also be transmitted via the fibers which are shown at 5 and 6.

In the rotationally stationary member 3, certain relative angular dispositions between the members 1 and 3 may cause the light in one or more of the fibers to change, for example light may contact a light-reflecting surface on the rotating 1, causing it to be reflected back into the light fiber 4. When using the photo-luminescence of a sensor, for example for temperature measurement, the excitation light for the sensor can be fed into a central light conducting fiber 2 and be distributed, within the member 1, to one or more sensors, from which the reflected or luminescent light returns through the rotating member 1 via the fibers 5 to the fiber 6, which are located as shown in FIGS. 1a and 1b, or vice versa.

With the rotationally stationary member constructed, for example, according to FIG. 1b, sensing in a number of different measuring channels is automatically obtained as a consequence of the relative rotation between the members 1 and 3.

The light is transmitted across the air gap 7 formed between the members 1 and 3 between the confronting ends of the fibers (see FIG. 2). The gap 7 can be sealed against the environment by, for example, an O-ring 8, to exclude dust or other particles from the exposed ends of the fibers and a thus-sealed gap can be filled with a light transmitting liquid, for example, to reduce the refractive index discontinuity at the gap.

The measurement and signal transmission is based on optical fibers being inserted into the rotating member 1 through the center of its shaft. At the end of the shaft in the rotationally stationary member 3 there is mounted a holder 9 for the cooperating fiber or fibers. The holder 9 is journalled in the shaft 10 and can then accompany said shaft in any axial movements. The rotationally stationary member 3 can be secured against rotation, for example, by a mechanical link 11.

When more than one measuring channel is desired, the fibers can be positioned as shown at 5 in FIG. 1b. These fibers 5 can be connected each to a different sensor in the rotating member 1. The rotationally stationary member 3 can have one central fiber 4 serving as a common central measuring channel. and one additional fiber 6 (see FIG. 1a) at a certain radius from the center which corresponds to the radius at which the peripherial fibers 5 are located in the rotating member 1. The additional fiber 6 in the rotationally stationary member 3 can be used for feeding excitation light in turn to the sensors. The central fiber (4, 2) can be used for the measuring signal coming back from all the sensors in the rotating member 1. As previously mentioned, with such an arrangement, the measuring signals are automatically sequenced, sensor by sensor, as the fibers 5 pass in alignment with the fiber 6, by virtue of the relative rotation between members 1 and 3. In the rotating member 1—when more than one sensor is used—the central fiber is coupled to each of the sensors so that the measuring signals, coming back from the sensors, and often at a wavelength different from that of the incident light fed to the sensors can all be transmitted through the central fiber 2, 4. The sequence of measuring signals can be separated from each other by time division multiplexing, which occurs automatically when the member 1 is rotating.

In order to locate from which sensor any particular measured value has been derived, an additional fiber 12 can be employed in the rotationally stationary member 3, which, once each revolution, passes a reflective area 12' on the member 1. By means of the members 12, 12' a synchronizing signal is obtained once each revolution. Using this synchronizing signal it is an easy matter for the measuring electronic system to determine from which sensor each particular measured value has been derived and thereby integrate the individual signals in each measuring channel.

A plurality of measuring channels can also be used via a single fiber with a gap at the axis of rotation of the member 1. In this case an electrical multiplexing of the light signals from each sensor can be used by providing a light-emitting diode (LED) in the electronic system of each sensor and feeding the light outputs from each sensor into the single fiber so that the measuring signals from each sensor are sequentially fed back to a single detector unit.

Each measuring channel fiber 5 in the rotating member 1 can be fed with sensor exciting light from one or more fibers 6 in the stationary member 3 at the same radius from the axis as the fibers 5 and the returning measuring signals can use the same measuring channel fibers or can be time division multiplexed in a common central fiber 2, 4.

When there is only one light conductor for each sensor, the incident light fed to the sensor must be distinguishable from the light emitted by the sensor, for example by using different wavelengths. When there are two or more light conductors, this is not necessary if the light feed takes place via the central light conductor. FIG. 3 shows a rotating member 1 with two sensors 13. A centrally located light conductor 14 is provided in both in non-rotating member 3 and in the rotating member 1 and this central light conductor is interrupted at a gap 15 between these two members. Further light conductors 17 are arranged at a certain radius from the rotating axis for the incident excitation light or for the returning measuring signals. One single central light conductor 16, interrupted at a gap 15, is shown in FIG. 4.

From what has been said above it will be appreciated that light conductors may be positioned in many ways in a transmission device according to the invention. A central conductor need not be used. The incident light feed and the returning measuring signal may use the same or different fibers. The sensors may be electrically passive or electrically active.

An electrically active device in the rotating member 1 can be fed with light energy by way of fibers in the transmission device. The electrically active measuring device transforms the incident light energy into an electrical signal which can be fed back to the detector unit via a slip coupling or radiated thereto. Alternatively, the electrical signal can be transformed in the rotating portion into a further light signal and then fed back across the gap between the members via light conductor ends.

The invention may be varied in many ways within the scope of the following claims.

What is claimed is:

1. An optical signal transmission device for transmitting excitation light for exciting at least one sensor element and light emanating therefrom between a rotating member and a rotationally stationary member spaced from one another on a bearing member rotatably interconnecting said members to form a gap between respective confronting regions of said members, comprising:
    a light conductor having an end portion located substantially in the center of each of said confronting regions and in confronting relationship with one another across said gap;
    at least one light conductor within each said member and having respective end portions in a central area of a respective one of said confronting regions and spaced from the center of rotation of a respective member to be in confronting relationship with a corresponding light conductor in the other member across said gap;
    whereby said excitation light and said light emanating from said at least one sensor element are each transmitted between said rotating member and said rotationally stationary member with relative rotation of said members with respect to one another.

2. An optical signal transmission device according to claim 1, in which a reflective area is provided on said confronting region of one of said members and a light conductor is provided in the other said member and having an end portion in the confronting region of said other member, whereby said reflective area reflects light signals from said light conductor back into said light conductor at least once per each 360 degree rotation between said members.

3. An optical signal transmission device according to claim 1, further comprising an elastic seal attached to each of said confronting regions and enclosing said gap to protect the end portions of the light conductors from environmental pollution.

4. An optical signal transmission device according to claim 3, further comprising an optically transparent liquid retained in said gap by said seal.

5. An optical signal transmission device according to claim 1 in which said at least one sensor element is located in said rotating member, and said excitation light is transmitted from a light conductor in said rotationally stationary member to a corresponding light conductor in said rotating member, and said light emanating from said at least one sensor element is returned through the same light conductor as said excitation light.

6. An optical signal transmission device according to claim 1 in which said at least one sensor element is an electrically active measuring sensor located in said rotating member and is excited with excitation light from any two confronting end portions of said light conductors, said device further comprising an electrical slip coupling mounted between said members, and said electrically active measuring sensor transforms the incident light energy into an electrical measuring signal coupled to said electrical slip coupling.

7. An optical signal transmission device according to claim 6, further comprising means for transforming said electrical measuring signal into a light signal emitted from said rotating member, and said emitted light signal is transmitted to said rotationally stationary member through the same light conductor used for transmitting excitation light to said electrically active measuring sensor.

8. An optical signal transmission device according to claim 1 wherein said at least one sensor element emits luminescent light when excited by said excitation light.

9. An optical signal transmission device as claimed in claim 1 wherein said at least one sensor element is located in said rotating member and light for exciting said at least one sensor element is transmitted between said members via said light conductors located substantially in the center of each of said confronting regions and the light emanating from said at least one sensor element is transmitted between said members via the light conductors having end portions in a central area of a respective one of said confronting regions.

10. An optical signal transmission device as claimed in claim 1 wherein said at least one sensor element is located in said rotating member and light for exciting said at least one sensor element is transmitted between said members via said light conductors having end portions in a central area of a respective one of said confronting regions, and the light emanating from said at least one sensor element is transmitted between said members via said light conductors located substantially in the center of each of said confronting regions.

11. An optical signal transmission device for transmitting excitation light for exciting at least one sensor element and light emanating therefrom between a rotating member and a rotationally stationary member, comprising:

bearing means rotatably interconnecting said members in spaced relationship to one another to form a gap between respective confronting regions of said members and enabling relative rotation between said confronting regions;

a light conductor having an end portion located substantially in the center of each of said confronting regions and in confronting relationship with one another across said gap;

at least one light conductor within each said member and having respective end portions in a central area of a respective one of said confronting regions and spaced from the center of rotation of a respective member to be in confronting relationship with a corresponding light conductor in the other member across said gap at least once for each 360 degree of relative rotation between said members; and the number of light conductors in one said member is greater than the number of light conductors in the other said member, for transmission of light signals between respective confronting light conductors in said one member in successive order.

12. An optical signal transmission device according to claim 11 wherein said one member is said rotating member and the light conductors therein are each connected to a respective sensor element and one of said light conductors having an end portion in said central area of said rotationally stationary member emits excitation light for scanning a number of light conductors in said central region of said rotating member with relative rotation between said members, whereby the light signals emitted from said sensor elements are time-division multiplexed.

13. An optical signal transmission device as claimed in claim 11, wherein said sensor elements are adapted for the measurement of temperature and having photoluminescent emission varying in intensity as a function of temperature, and said photoluminescent sensor elements are excited by light emanating from said light conductor having an end portion in the center of said rotationally stationary member, and the photoluminescent light emission from said sensors is transmitted across said gap via said light conductors spaced from the center of rotation of said members.

* * * * *